(12) United States Patent
Yousefpor et al.

(10) Patent No.: US 9,984,270 B2
(45) Date of Patent: May 29, 2018

(54) FINGERPRINT SENSOR IN AN ELECTRONIC DEVICE

(71) Applicant: Apple Inc., Cupertino, CA (US)

(72) Inventors: Marduke Yousefpor, Cupertino, CA (US); Jean-Marie Bussat, Cupertino, CA (US); Benjamin B. Lyon, Cupertino, CA (US); Giovanni Gozzini, Cupertino, CA (US); Steven P. Hotelling, Cupertino, CA (US); Dale Setlak, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 14/451,076

(22) Filed: Aug. 4, 2014

(65) Prior Publication Data

US 2015/0036065 A1 Feb. 5, 2015

Related U.S. Application Data

(60) Provisional application No. 61/862,335, filed on Aug. 5, 2013.

(51) Int. Cl.
*G06K 9/00* (2006.01)
*G06K 9/22* (2006.01)
(Continued)

(52) U.S. Cl.
CPC .......... *G06K 9/0002* (2013.01); *G06K 9/228* (2013.01); *H04M 1/0266* (2013.01); *H04M 1/67* (2013.01)

(58) Field of Classification Search
CPC ..... G07C 9/0087; G06F 21/32; H04M 1/0266
(Continued)

(56) References Cited

U.S. PATENT DOCUMENTS 3,876,942 A 4/1975 Koster
4,221,418 A 12/1983 Morishima
(Continued)

FOREIGN PATENT DOCUMENTS

AU 2013100571 5/2013
CN 1164075 11/1997
(Continued)

OTHER PUBLICATIONS

Third Party Submission Under 37 C.F.R. 1.290 dated Jul. 23, 2015, U.S. Appl. No. 14/451,076, 8 pages.
(Continued)

*Primary Examiner* — Vernal Brown
(74) *Attorney, Agent, or Firm* — Brownstein Hyatt Farber Schreck, LLP

(57) ABSTRACT

A fingerprint sensor is incorporated in a display stack in an electronic device. A single fingerprint can be captured at one time at a single pre-defined fixed location on a display. Alternatively, a single fingerprint can be acquired at one time at any location on a display. Alternatively, multiple touches on the display can be acquired substantially simultaneously where only one fingerprint is captured at a time or where all of the fingerprints are acquired at the same time. The fingerprint sensor can be implemented as an integrated circuit connected to a bottom surface of a cover sheet, near the bottom surface of the cover sheet, or connected to a top surface of a display. Alternatively, the fingerprint sensor can be implemented as a full panel fingerprint sensor.

14 Claims, 14 Drawing Sheets

(51) Int. Cl.
*H04M 1/02* (2006.01)
*H04M 1/67* (2006.01)

(58) Field of Classification Search
USPC ..................................................... 340/5.83
See application file for complete search history.

(56) References Cited

U.S. PATENT DOCUMENTS

| | | | |
|---|---|---|---|
| 5,235,343 A | | 8/1993 | Audren et al. |
| 5,354,599 A | * | 10/1994 | McClanahan ..... H01L 23/49894 |
| | | | 257/E23.077 |
| 5,650,597 A | | 7/1997 | Redmayne |
| 5,731,222 A | | 3/1998 | Malloy et al. |
| 5,953,441 A | | 9/1999 | Setlak |
| 5,963,679 A | | 10/1999 | Setlak |
| 6,011,859 A | | 1/2000 | Kalnitsky et al. |
| 6,049,620 A | | 4/2000 | Dickinson et al. |
| 6,067,368 A | | 5/2000 | Setlak et al. |
| 6,088,471 A | | 7/2000 | Setlak et al. |
| 6,259,804 B1 | | 7/2001 | Setlak et al. |
| 6,327,376 B1 | | 12/2001 | Harkin |
| 6,400,359 B1 | | 6/2002 | Katabami |
| 6,483,931 B2 | | 11/2002 | Kalnitsky et al. |
| 6,522,773 B1 | | 2/2003 | Houdeau |
| 6,628,812 B1 | * | 9/2003 | Setlak ................... G06F 1/1616 |
| | | | 382/124 |
| 6,647,133 B1 | | 11/2003 | Morita |
| 6,734,655 B1 | | 5/2004 | Javanifard |
| 6,737,329 B2 | | 5/2004 | Lepert et al. |
| 6,815,657 B2 | | 11/2004 | Toyoshima et al. |
| 6,882,338 B2 | | 4/2005 | Flowers |
| 6,906,529 B2 | | 6/2005 | Blanchard |
| 6,914,517 B2 | | 7/2005 | Kinsella |
| 6,996,492 B1 | | 2/2006 | Testoni |
| 7,042,317 B2 | | 5/2006 | Xiao et al. |
| 7,043,060 B2 | | 5/2006 | Quintana |
| 7,194,113 B2 | | 3/2007 | Greschitz et al. |
| 7,202,764 B2 | | 4/2007 | Deligianni et al. |
| 7,227,213 B2 | | 6/2007 | Mastromatteo et al. |
| 7,236,765 B2 | | 6/2007 | Bonicatto et al. |
| 7,251,351 B2 † | | 7/2007 | Mathiassen |
| 7,262,609 B2 | | 8/2007 | Reynolds |
| 7,290,323 B2 | | 10/2007 | Deconde et al. |
| 7,318,550 B2 | | 1/2008 | Bonalle et al. |
| 7,397,096 B2 | | 7/2008 | Chou et al. |
| 7,403,749 B2 | | 7/2008 | Kuijstermans et al. |
| 7,460,109 B2 | | 12/2008 | Safai et al. |
| 7,521,942 B2 | | 4/2009 | Reynolds |
| 7,536,039 B2 | | 5/2009 | Shinoda et al. |
| 7,548,636 B2 | | 6/2009 | Shimamura et al. |
| 7,583,092 B2 | | 9/2009 | Reynolds et al. |
| 7,627,151 B2 | | 12/2009 | Rowe |
| 7,675,388 B2 | | 3/2010 | Cardona et al. |
| 7,683,638 B2 | | 3/2010 | Chuang et al. |
| 7,696,497 B2 | | 4/2010 | Rogers |
| 7,757,096 B2 | | 7/2010 | Murata et al. |
| 7,777,501 B2 | | 8/2010 | Reynolds et al. |
| 7,835,553 B2 | | 11/2010 | Miyasaka |
| 7,902,474 B2 | | 3/2011 | Mittleman et al. |
| 7,986,153 B2 | | 7/2011 | Easter |
| 8,031,916 B2 | | 10/2011 | Abiko et al. |
| 8,041,083 B2 | | 10/2011 | Pai et al. |
| 8,070,695 B2 | | 12/2011 | Gupta |
| 8,073,204 B2 | | 12/2011 | Kramer et al. |
| 8,093,099 B2 | | 1/2012 | Purushothaman et al. |
| 8,107,212 B2 | | 1/2012 | Nelson et al. |
| 8,111,136 B2 | | 2/2012 | Wong et al. |
| 8,116,540 B2 | | 2/2012 | Dean et al. |
| 8,174,372 B2 | | 5/2012 | da Costa |
| 8,195,117 B2 | | 6/2012 | Bult et al. |
| 8,196,809 B2 | | 6/2012 | Thorstensson |
| 8,264,463 B2 | | 9/2012 | Takashima et al. |
| 8,283,934 B2 | | 10/2012 | Nishizono |
| 8,305,360 B2 | | 11/2012 | Wu |
| 8,358,816 B2 | | 1/2013 | Sherlock et al. |
| 8,366,633 B2 | | 2/2013 | Wolf |
| 8,456,330 B2 | | 6/2013 | Filson et al. |
| 8,461,948 B2 | | 6/2013 | Pulskamp |
| 8,482,381 B2 | | 7/2013 | Chatterjee et al. |
| 8,482,546 B2 | | 7/2013 | Chai et al. |
| 8,529,474 B2 | | 9/2013 | Gupta et al. |
| 8,598,555 B2 | | 12/2013 | Guerrero |
| 8,606,227 B2 | | 12/2013 | Karam et al. |
| 8,633,916 B2 | | 1/2014 | Bernstein et al. |
| 8,716,613 B2 | | 5/2014 | Pererselsky et al. |
| 8,717,775 B1 | | 5/2014 | Bolognia et al. |
| 8,723,062 B2 | | 5/2014 | Chen |
| 8,724,038 B2 | | 5/2014 | Ganapathi et al. |
| 8,736,001 B2 | | 5/2014 | Salatino et al. |
| 8,743,082 B2 | | 6/2014 | Ganapathi et al. |
| 8,743,083 B2 | | 6/2014 | Zanone et al. |
| 8,748,842 B2 | | 6/2014 | Ohashi |
| 8,749,523 B2 | | 6/2014 | Pance et al. |
| 8,779,540 B2 | | 7/2014 | Kerness et al. |
| 8,780,071 B2 | | 7/2014 | Chen |
| 8,782,775 B2 | | 7/2014 | Fadell et al. |
| 8,791,792 B2 | | 7/2014 | Benkley |
| 8,797,298 B2 | | 8/2014 | Brosnan et al. |
| 8,841,749 B2 | | 9/2014 | Joblot et al. |
| 8,860,683 B2 | | 10/2014 | Baumbach |
| 8,866,347 B2 | | 10/2014 | Benkley, III |
| 8,888,004 B2 | | 11/2014 | Setlak et al. |
| 8,890,016 B2 | | 11/2014 | Silverman |
| 8,907,897 B2 | | 12/2014 | Ferren et al. |
| 9,035,895 B2 | | 5/2015 | Bussat et al. |
| 9,065,321 B2 | | 6/2015 | Divan et al. |
| 9,099,282 B2 | | 8/2015 | Rogers et al. |
| 9,110,538 B2 | | 8/2015 | Dunko et al. |
| 9,135,495 B1 | | 9/2015 | Pope et al. |
| 9,153,490 B2 | | 10/2015 | Mitsuhashi et al. |
| 9,158,403 B2 | | 10/2015 | Kasamatsu |
| 9,158,958 B2 | | 10/2015 | Wickboldt et al. |
| 9,239,655 B2 | | 1/2016 | Hershman |
| 9,316,677 B2 | | 4/2016 | Grunthaner et al. |
| 9,323,972 B2 | | 4/2016 | Bussat et al. |
| 9,460,332 B1 | | 10/2016 | Bussat |
| 2002/0065054 A1 | | 5/2002 | Humphreys et al. |
| 2005/0156906 A1 | | 7/2005 | Chiu |
| 2007/0076923 A1 | | 4/2007 | Chiu |
| 2008/0025582 A1 | | 1/2008 | Kobayashi |
| 2008/0049980 A1 | | 2/2008 | Castaneda et al. |
| 2008/0061300 A1 | * | 3/2008 | Chaug ................... G02F 1/1345 |
| | | | 257/72 |
| 2008/0238878 A1 | | 10/2008 | Wang |
| 2009/0008729 A1 | | 1/2009 | Yang et al. |
| 2009/0085879 A1 | | 4/2009 | Dai et al. |
| 2009/0160796 A1 | * | 6/2009 | Jiang ..................... G06F 3/044 |
| | | | 345/173 |
| 2009/0260900 A1 | | 10/2009 | Ure |
| 2010/0110019 A1 | | 5/2010 | Ozias et al. |
| 2010/0156595 A1 | | 6/2010 | Wong et al. |
| 2010/0176271 A1 | | 7/2010 | Krim et al. |
| 2010/0201485 A1 | | 8/2010 | Chou |
| 2010/0321159 A1 | | 12/2010 | Stewart |
| 2011/0102569 A1 | | 5/2011 | Erhart |
| 2011/0122082 A1 | | 5/2011 | Orellana |
| 2011/0234623 A1 | | 9/2011 | Ure |
| 2011/0267298 A1 † | | 11/2011 | Erhart |
| 2011/0298711 A1 | | 12/2011 | Dean et al. |
| 2012/0090757 A1 | | 4/2012 | Buchan et al. |
| 2012/0097510 A1 | | 4/2012 | Mitchell |
| 2012/0113044 A1 | | 5/2012 | Strazisar et al. |
| 2012/0206406 A1 | | 8/2012 | Kim et al. |
| 2012/0242635 A1 | | 9/2012 | Erhart et al. |
| 2012/0267740 A1 | | 10/2012 | Okamoto |
| 2012/0287587 A1 | | 11/2012 | Los |
| 2013/0015868 A1 | | 1/2013 | Peng |
| 2013/0141388 A1 | | 6/2013 | Ludwig |
| 2013/0194071 A1 † | | 8/2013 | Slogedal |
| 2013/0231046 A1 | | 9/2013 | Pope et al. |
| 2013/0271422 A1 | | 10/2013 | Hotelling et al. |
| 2013/0279769 A1 † | | 10/2013 | Benkley |
| 2013/0307818 A1 | | 11/2013 | Pope et al. |
| 2014/0103943 A1 | | 4/2014 | Dunlap et al. |

(56) References Cited

U.S. PATENT DOCUMENTS

| | | | |
|---|---|---|---|
| 2014/0135597 A1 | 5/2014 | Wolf | |
| 2014/0216914 A1 | 8/2014 | Pope et al. | |
| 2014/0218339 A1 | 8/2014 | Hotelling et al. | |
| 2014/0241595 A1* | 8/2014 | Bernstein | G06K 9/0002 382/124 |
| 2014/0341446 A1* | 11/2014 | Hare | G06F 3/0416 382/124 |
| 2014/0354596 A1* | 12/2014 | Djordjev | G06K 9/0002 345/175 |
| 2014/0355376 A1* | 12/2014 | Schneider | G01S 7/56 367/7 |
| 2014/0361395 A1 | 12/2014 | Bhagavat et al. | |
| 2015/0002459 A1 | 1/2015 | Watanabe et al. | |
| 2015/0022495 A1 | 1/2015 | Bussat et al. | |
| 2015/0070079 A1 | 3/2015 | Yang et al. | |
| 2015/0071509 A1 | 3/2015 | Myers | |
| 2015/0248574 A1 | 9/2015 | Mrazek et al. | |
| 2016/0004896 A1 | 1/2016 | Pope et al. | |
| 2016/0070383 A1 | 3/2016 | Toyoshima et al. | |
| 2016/0092714 A1 | 3/2016 | Yazandoost et al. | |
| 2016/0092715 A1 | 3/2016 | Yazandoost et al. | |
| 2016/0092716 A1 | 3/2016 | Yazandoost et al. | |
| 2016/0217311 A1 | 7/2016 | Bhagavat et al. | |
| 2016/0267313 A1 | 9/2016 | Pope et al. | |
| 2016/0278671 A1 | 9/2016 | Bhagavat et al. | |
| 2017/0109565 A1 | 4/2017 | Pope et al. | |
| 2017/0351902 A1 | 12/2017 | Pope et al. | |

FOREIGN PATENT DOCUMENTS

| | | |
|---|---|---|
| CN | 1164076 | 11/1997 |
| CN | 1172308 | 2/1998 |
| CN | 1278347 | 12/2000 |
| CN | 1450489 | 10/2003 |
| CN | 1463409 | 12/2003 |
| CN | 1538142 | 10/2004 |
| CN | 1680818 | 10/2005 |
| CN | 1802882 | 7/2006 |
| CN | 101281589 | 10/2008 |
| CN | 101339951 | 1/2009 |
| CN | 101689853 | 3/2010 |
| CN | 101809581 | 8/2010 |
| CN | 101901092 | 12/2010 |
| CN | 202153359 | 2/2012 |
| CN | 203535651 | 4/2014 |
| EP | 0457398 | 11/1991 |
| EP | 0791899 | 8/1997 |
| EP | 0924656 | 6/1999 |
| EP | 1775674 | 4/2007 |
| JP | 2000187420 | 4/2000 |
| JP | 2001339057 | 12/2001 |
| JP | 2001344605 | 12/2001 |
| JP | 2002502518 | 1/2002 |
| JP | 2003298753 | 10/2003 |
| JP | 2004310574 | 11/2004 |
| JP | 2005011672 | 1/2005 |
| JP | 2005115513 | 4/2005 |
| JP | 2005338918 | 12/2005 |
| JP | 2006134144 | 5/2006 |
| JP | 3138518 | 12/2007 |
| JP | 2012083829 | 4/2012 |
| KR | 20080035133 | 4/2008 |
| TW | M327066 U | 2/2008 |
| TW | 200937306 | 9/2009 |
| TW | 201017554 | 5/2010 |
| TW | 201017555 | 5/2010 |
| TW | 201229852 | 7/2012 |
| TW | 201346779 | 11/2013 |
| WO | WO 98/052145 | 11/1998 |
| WO | WO 01/029795 | 4/2001 |
| WO | WO 01/059558 | 8/2001 |
| WO | WO 04/077340 | 10/2004 |
| WO | WO 04/098083 | 11/2004 |
| WO | WO 05/124659 | 12/2005 |
| WO | WO 13/130396 | 9/2013 |
| WO | 2014128249 A1 † | 8/2014 |
| WO | WO 14/128249 | 8/2014 |

OTHER PUBLICATIONS

Third Party Submission Under 37 C.F.R. 1.290 dated Jul. 31, 2015, U.S. Appl. No. 14/451,076, 22 pages.
U.S. Appl. No. 14/855,123, filed Sep. 15, 2015, Pope et al.
U.S. Appl. No. 15/018,617, filed Feb. 8, 2016, Pope et al.
U.S. Appl. No. 15/181,229, filed Jun. 13, 2016, Bhagavat et al.
U.S. Appl. No. 14/709, filed May 11, 2015, Pope et al.
Motorola User Guide, Motorola Atrix™ 4G (MB860), Manual No. 68XXXXX468-A, Motorola Mobility Inc., 2011, 90 pages.
Motorola Atrix (MB860), Manual No. 68014798001-B, Motorola Mobility Argentina S.A., 2011, 68 pages.
U.S. Appl. No. 13/842,635, filed Mar. 15, 2013, Hotelling et al.
U.S. Appl. No. 13/842,920, filed Mar. 15, 2013, Pope et al.
U.S. Appl. No. 14/022,058, filed Sep. 9, 2013, Yang et al.
U.S. Appl. No. 14/247,419, filed Apr. 8, 2014, Pope et al.
U.S. Appl. No. 14/251,304, filed Apr. 11, 2014, Hotelling et al.
U.S. Appl. No. 14/256,888, filed Apr. 18, 2014, Myers.
U.S. Appl. No. 14/294,903, filed Jun. 3, 2014, Bhagavat et al.
U.S. Appl. No. 14/335,553, filed Jul. 18, 2014, Bussat et al.
U.S. Appl. No. 14/481,568, filed Sep. 9, 2014, Bussat.
Author Unknown, "DC-to-DC converter," Wikipedia, the free encyclopedia, Apr. 12, 2012, XP 055092945, retrieved from the internet on Dec. 11, 2013: URL:http://en.wikipedia.org/w/index.php?title=DC-to-DC_converter&oldid=487061873.
Setlak, Chapter 2: Advances in Fingerprint Sensors Using RF Imaging Techniques, *Automatic Fingerprint Recognition Systems*, Editor: Ratha et al., 2003, New York, Springer Verlag, US, pp. 27-53, XP002347781, ISBN: 978-0-387-95593-3.

\* cited by examiner
† cited by third party

FINGERPRINT SENSOR IN AN ELECTRONIC DEVICE

CROSS-REFERENCE TO RELATED APPLICATION

This application claims the benefit under 35 U.S.C. § 119(e) of U.S. Provisional Patent Application No. 61/862,335, filed Aug. 5, 2013, entitled "Fingerprint Sensor In An Electronic Device," the entirety of which is incorporated herein by reference as if fully disclosed herein.

TECHNICAL FIELD

The present invention relates generally to electronic devices, and more specifically to one or more fingerprint sensors in a display stack of an electronic device.

BACKGROUND

Several methods have been considered for incorporating fingerprint sensing functionality into touch screen displays. In some proposals, the fingerprint sensing functionality is added by inserting several layers of circuitry above the display structures. In these designs, the additional layers over the display can degrade image quality.

Systems that capture a fingerprint by sensing electric fields may not function well when located entirely beneath a liquid crystal display (LCD) layer or a light-emitting diode (LED) layer of a display panel. The structure of the LCD layer and the LED layer can act as an electrical shield, which prevents the system from reading the fingerprint. In situations where this electric shield effect can be avoided, the distance through the LCD and LED layer may be too great for the system to accurately read the fingerprint.

SUMMARY

Embodiments described herein provide one or more fingerprint sensors in a display stack of an electronic device. In one aspect, an electronic device can include a display stack comprising a cover sheet disposed over a display layer, and a fingerprint sensor included in the display stack. The fingerprint sensor captures a fingerprint image of one or more fingers positioned on a top surface of the cover sheet. In one embodiment, the fingerprint sensor is attached to a bottom surface of the cover sheet.

In some embodiments, one or more blind vias is formed in the cover sheet above the fingerprint sensor. A length of each blind via may be less than a thickness of the cover sheet. One or more conductive plates can be positioned between a top surface of the fingerprint sensor and a bottom surface of the cover sheet.

In some embodiments, the cover sheet can include an upper cover sheet and a lower cover sheet attached to the upper cover sheet. In one embodiment, the fingerprint sensor may be attached to a bottom surface of the lower cover sheet. One or more optional through vias may be formed in the lower cover sheet above the fingerprint sensor. A length of the through vias can be substantially equal to a thickness of the lower cover sheet. An optional conductive plate may be positioned near the top and/or the bottom of at least one through via.

In some embodiments, the fingerprint sensor is a full panel fingerprint sensor. The full panel fingerprint sensor may also function as a touch sensing device. The full panel fingerprint sensor can employ any suitable sensing technology. In one example, the full panel fingerprint sensor can be a full panel capacitive fingerprint sensor. In another example, the full panel fingerprint sensor may be a full panel ultrasonic fingerprint sensor.

In some embodiments, the cover sheet can include a first cover sheet disposed over the full panel fingerprint sensor, and a second cover sheet disposed below the full panel fingerprint sensor. A first remote electronics can be disposed at an edge of the full panel fingerprint sensor. An intermediate layer may be disposed between the second cover sheet and the display layer and a second remote electronics can be attached between the display layer and the bottom surface of the second cover sheet. The second remote electronics may be operably connected to the first remote electronics.

In some embodiments, one or more blind vias can be formed in the first cover sheet above the full panel fingerprint sensor. A length of each blind via may be less than a thickness of the cover sheet. Optional conductive plates can be positioned between a top surface of the fingerprint sensor and a bottom surface of the first cover sheet. Alternatively, one or more through vias may be formed in the first cover sheet above the full panel fingerprint sensor. A length of the through vias can be substantially equal to a thickness of the first cover sheet. An optional conductive plate may be positioned near the top and/or the bottom of at least one through via.

In another aspect, an electronic device can include a display+in-cell ultrasonic piezoelectric receiver layer attached between an intermediate layer in a display stack and an ultrasonic piezoelectric transmitter layer.

In another aspect, an electronic device may include a full panel ultrasonic fingerprint sensor that includes a display+in-cell capacitive sensing layer attached to an intermediate layer in a display stack.

In yet another aspect, a display for an electronic device can include a cover sheet disposed over a touch sensing layer and a display layer disposed below the touch sensing layer. An ultrasonic receiver layer may be disposed below the display layer, and an ultrasonic transmitter layer below the ultrasonic receiver layer. A full panel ultrasonic fingerprint sensor can be positioned between the ultrasonic receiver layer and the ultrasonic transmitter layer.

BRIEF DESCRIPTION OF THE DRAWINGS

Embodiments are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide one or more fingerprint sensors that are incorporated in a display stack of an electronic device. The fingerprint sensor can employ any type of sensing technology, including, but not limited to, capacitive, piezoelectric, and ultrasonic sensing technologies. In one embodiment, a single fingerprint can be captured at one time at a single pre-defined fixed location on a display. In another embodiment, a single fingerprint can be acquired at one time at any location on a display. In other embodiments, multiple touches on the display can be acquired substantially simultaneously where only one fingerprint is captured at a time or where all of the fingerprints are acquired at the same time. The fingerprint sensor can be implemented as an integrated circuit or chip connected to a bottom surface of a cover sheet, near the bottom surface of the cover sheet, or connected to a top surface of a display layer. Alternatively, the fingerprint sensor can be implemented as a full panel fingerprint sensor.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers.

Figure 1:
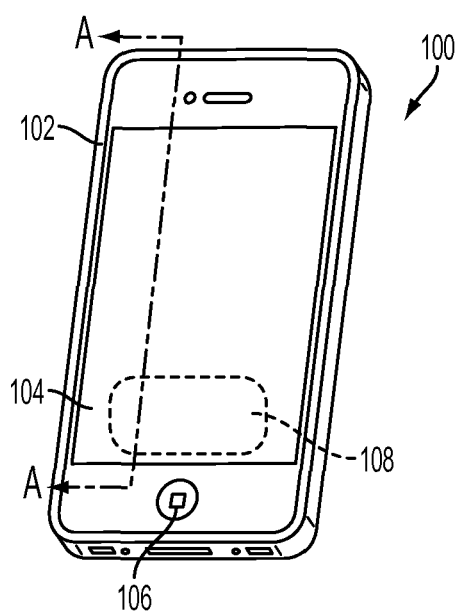
FIG. 1 is a perspective view of one example of an electronic device that can include a fingerprint sensor in a display stack of an electronic device.

Referring now to FIG. 1, there is shown a perspective view of one example of an electronic device that can include a fingerprint sensor in a display stack of an electronic device. In the illustrated embodiment, the electronic device 100 is implemented as a smart telephone. Other embodiments can implement the electronic device differently, such as, for example, a laptop or desktop computer, a tablet computing device, a digital music player, a display input device, a kiosk, and other types of electronic devices that include a display.

The electronic device 100 includes an enclosure 102 at least partially surrounding a display 104 and one or more buttons 106 or input elements. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 may include a display stack that is formed with multiple layers, including a display layer. The display can be implemented with any suitable technology, including, but not limited to, a multi-touch sensing touchscreen device that uses liquid crystal display (LCD) technology, light emitting diode (LED) technology, organic light-emitting display (OLED) technology, or organic electroluminescence (OEL) technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass or sheet of the electronic device.

A fingerprint sensor 108 may be included in at least a portion of the display stack for the display 104, or otherwise underlie a segment of the cover sheet or housing. As a further example, the fingerprint sensor may be located beneath the cover sheet in a non-display region, such as beneath an ink or mask layer. Accordingly, it should be appreciated that embodiments discussing a fingerprint sensor incorporated into a display stack are intended to encompass embodiments where the fingerprint sensor is located adjacent or near a display layer, but beneath a cover glass or other cover sheet.

In the illustrated embodiment, the fingerprint sensor uses a single pre-defined fixed location (for example, the area in the dashed box in FIG. 1) on a top surface of the display stack as an input region. The input region for the fingerprint sensor 108 can have any dimensions and/or shape. Additionally, multiple fingerprint sensors can be included in a display stack in other embodiments.

In one embodiment, the fingerprint sensor 108 is implemented as a capacitive fingerprint sensor and includes one or more capacitive sensing elements. Other embodiments can use different types of sensing technologies. For example, ultrasonic, infrared, multi-spectral, RF, thermal, optical, resistance, and piezoelectric technologies can be used instead of, or in addition to, capacitive sensing.

Figure 2:
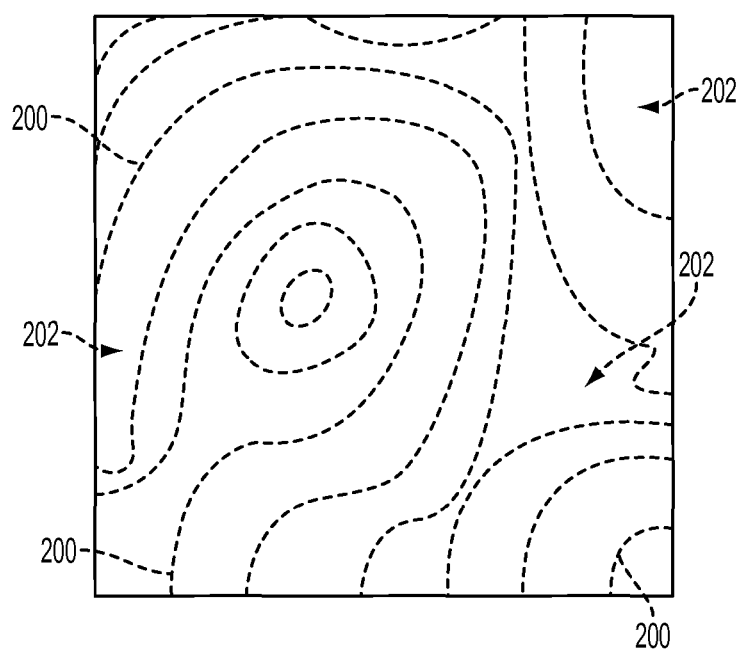
FIG. 2 is a graphic illustration of a portion of a fingerprint image.

A fingerprint is generally formed from ridges and valleys arranged in a unique pattern. FIG. 2 is a graphic illustration of a portion of a fingerprint image. In FIG. 2, the ridges 200 are represented with dashed lines. The valleys 202 are located in the areas between the ridges 200. Typically, in a capacitive fingerprint sensor, the capacitance measured between a ridge 200 and the sensor varies from the capacitance measured between a valley 202 and the sensor. The measured capacitance between a ridge and the sensor can be greater than the measured capacitance between a valley and the sensor because the ridge is closer to the sensor. The differences in the measured capacitances can be used to distinguish between ridges and valleys and produce a fingerprint image.

It should be appreciated that alternative fingerprint sensing technologies may measure fingerprints differently, and it should be further appreciated that these alternative fingerprint sensing technologies may be used or incorporated into embodiments described herein. For example, ultrasonic, optical, inductive and/or thermal fingerprint sensing technologies may be used with various embodiments described herein instead of capacitive sensing.

As used herein, the term "image" or "fingerprint image" includes an image and other types of data that can be captured by a fingerprint sensor and/or used to represent a fingerprint. By way of example only, a fingerprint sensor can produce a data structure that defines the features in a fingerprint. In some embodiments, multiple images of various portions of a fingerprint can be combined to create a composite image.

Figure 3A:
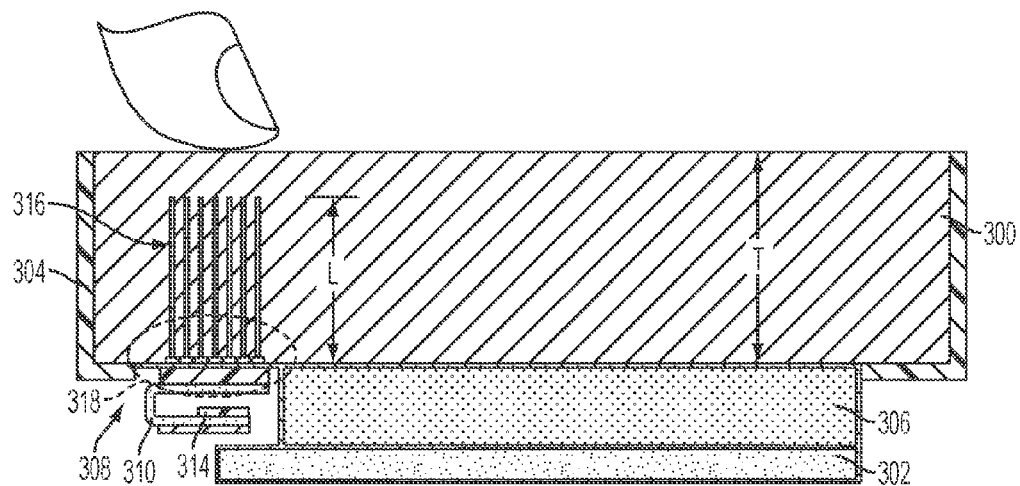
FIG. 3A is a simplified cross-section view of the display taken along line A-A in FIG. 1 in accordance with one embodiment.

Referring now to FIG. 3A, there is shown a simplified cross-section view of the display 104 taken along line A-A in FIG. 1 in accordance with one embodiment. The display can include a display stack having a cover sheet 300 disposed over a display layer 302. The cover sheet can be made of any suitable material, including a transparent plastic, glass or sapphire (all of which may be chemically strengthened). Additionally, the cover sheet 300 can have any given thickness. In some embodiments, the cover sheet has a thickness (represented by T) of 600 microns or less. The sides of the cover sheet 300 can be surrounded by an enclosure 304 (e.g., enclosure 102 in FIG. 1). In the illustrated embodiment, the enclosure 304 extends partially under the bottom surface of the cover sheet and can support the cover sheet 300.

As described earlier, any suitable display technology can be implemented in the display layer 302. Example display technologies include, but are not limited to, liquid crystal display (LCD) technology and light emitting diode (LED) technology. In one embodiment, the display layer 302 is implemented as a thin-film-transistor liquid crystal display (TFT LCD).

An intermediate layer 306 is positioned between the cover sheet 300 and the display layer 302. The intermediate layer 306 can be implemented as one or more layers or elements. For example, the one or more layers can include a color filter positioned between the cover sheet 300 and a polarizer, and a liquid optically clear adhesive (LOCA) positioned between the polarizer layer and the display layer 302. The LOCA attaches the display layer 302 to the intermediate layer 306. Other embodiments can have different or additional layers or elements.

A fingerprint sensor assembly 308 is attached to a portion of the bottom surface of the cover sheet 300 between the edge of the enclosure 304 and an edge of the intermediate layer 306. In some embodiments, a color masking layer may be included in the display stack over the fingerprint sensor to reduce the visibility of the fingerprint sensor to the user. The color masking layer can be disposed around the peripheral edges of the display layer 302 (above the display layer) so that other components and circuitry can be located in the areas around the display layer and not be visible to the user.

A conductive connector 310, such as a flexible circuit, connects the fingerprint sensor 312 (see FIG. 3B) to a conductive contact or integrated circuit 314. The conductive contact or integrated circuit can be connected to other circuitry in the display stack and/or in the electronic device. By way of example only, a signal line or flexible circuit can connect to the conductive contact or integrated circuit to transmit signals to or from the fingerprint sensor to a processing device. In some embodiments, additional circuitry can be disposed on the conductive connector 310.

Blind vias 316 are formed in the cover sheet 300 above the fingerprint sensor 312. In some embodiments, the blind vias 316 can also be formed in areas of the cover sheet that are not above the fingerprint sensor. The blind vias 316 extend vertically upwards from the fingerprint sensor 312 through only a portion of the cover sheet 300. The blind vias do not extend through the entire cover sheet 300 in the illustrated embodiment. Instead, the blind vias 316 have any given length L that is less than the thickness T of the cover sheet 300. The length L of the blind vias 316 can be based on one or more factors. For example, the type of fingerprint sensor, the type of electronic device, the properties of the materials in the display stack, and/or cosmetic factors may be considered when determining the length L. All of the blind vias 316 can have the same length or one or more blind vias can have a length that is different from one or more other blind vias. Any suitable method can be used to form the blind vias 316 in the cover sheet 300. By way of example only, the blind vias 316 can be mechanically, chemically, or laser etched into the cover sheet 300 or formed by ablation.

Some or all of the blind vias 316 can be filled with an anisotropic material, which may be a dielectric. The anisotropic material can have a higher or lower anisotropy than the anisotropy of the cover sheet 300. The material used to fill the blind vias can be selected to make the vias less visible through the cover sheet. For example, any or all of the index of refraction, color, transparency and other optical properties of the material in the vias may match or approach those of the cover sheet. The blind vias 316 can shape the electric field through induced anisotropy that is produced by the change in permittivity in the blind vias 316, thereby increasing or modifying the anisotropy of the material in the cover sheet 300. In some embodiments, the electric fields are channeled into the blind vias when the blind vias are filled with a material having a higher conductivity than the cover sheet 300. When the blind vias 316 are filled with a dielectric material, the electric field can be shaped differently in that the electric fields can be directed out of the blind vias 316 and into the cover sheet 300 around the blind vias 316.

Figure 3B:
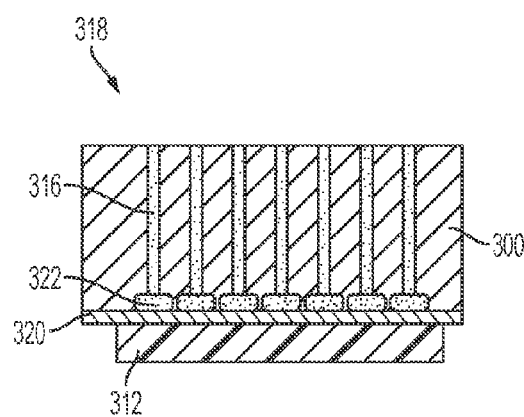
FIG. 3B is an enlarged view of area 318 in FIG. 3A.

An enlarged view of area 318 is shown in FIG. 3B. The fingerprint sensor 312 can be attached to the bottom surface of the cover sheet 300 with an adhesive 320. Optional conductive plates 322 can be attached between the cover sheet and the fingerprint sensor 312 (e.g., attached to the bottom surface of the cover sheet 300). The conductive plates may improve the sensitivity of the fingerprint sensor by providing a conductive interface between the termination point of the blind vias 316 and the fingerprint sensor 312.

In the illustrated embodiment, the fingerprint sensor 312 is a capacitive fingerprint sensor. The top surface of the cover sheet can act as an input region for the fingerprint sensor 312. When a finger touches the input region above the fingerprint sensor, the capacitance of one or more capacitive sensing elements in the fingerprint sensor 312 changes, and the measured capacitances can be used to capture a fingerprint image. The blind vias 316 can carry the signals through the cover sheet 300 with minimum degradation.

Figure 3C:
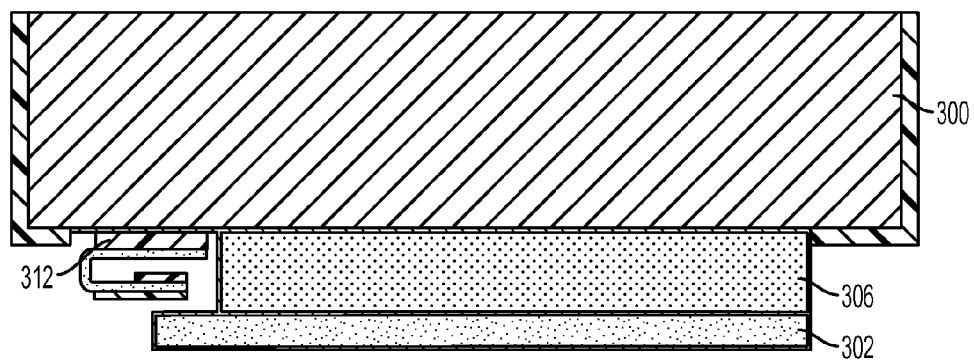
FIG. 3C is a simplified cross-section view of an alternative embodiment of a display stack and a fingerprint sensor.

FIG. 3C depicts an alternative embodiment of the display 104 and fingerprint sensor generally shown in FIGS. 3A-3B. Here, however, no vias are present or formed in the cover sheet 300. Rather, the fingerprint sensor 312 operates through the cover sheet without benefit of or reference to any vias. Likewise, the conductive plates 322 shown in FIG. 3B may be omitted in this embodiment. As previously discussed, an adhesive may affix the fingerprint sensor 312 to the cover sheet 300.

Figure 4A:
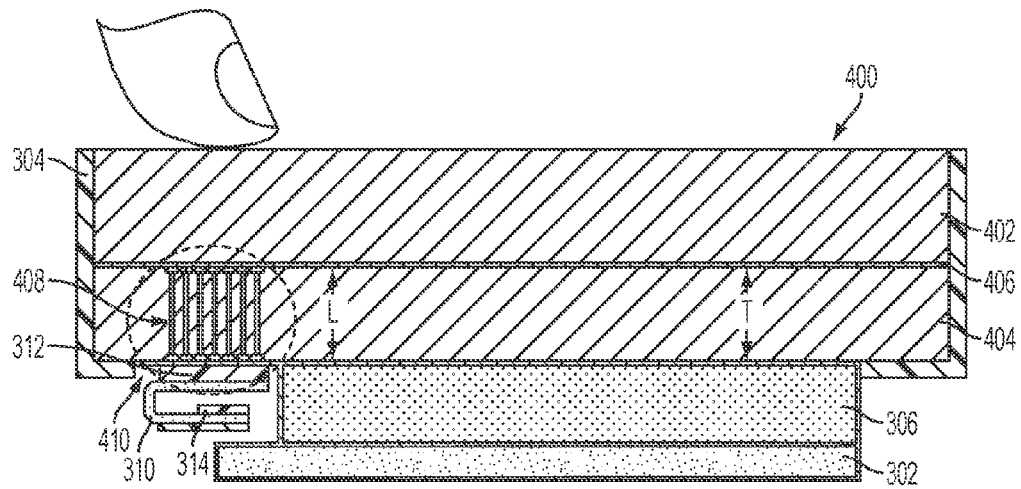
FIG. 4A is a simplified cross-section view of the display taken along line A-A in FIG. 1 in accordance another embodiment.

FIG. 4A is a simplified cross-section view of the display 104 taken along line A-A in FIG. 1 in accordance with another embodiment. Some of the elements shown in FIG. 4 can be the same elements as elements in the embodiment of FIGS. 3A-3B. Identical reference numbers are used in FIGS. 4A-4B for these elements. For simplicity and clarity, the elements are not described in detail.

The display may be formed with a display stack that includes a cover sheet 400 disposed over a display layer 302. The cover sheet is divided into an upper cover sheet 402 and a lower cover sheet 404. The upper cover sheet 402 can be attached to the lower cover sheet 404 using any suitable attachment mechanism 406. An adhesive layer is one example of an attachment mechanism. The upper and lower cover sheets 402, 404 can each be made of any suitable material, including a transparent glass, plastic, or sapphire (which may be chemically strengthened). For example, the upper cover sheet 402 can be made of glass and the lower cover sheet 404 of sapphire. Alternatively, both the upper and lower cover sheets 402, 404 can be made of glass. The upper and lower cover sheets 402, 404 can each have any given thickness.

The sides of the upper and lower cover sheets 402, 404 can be enclosed by an enclosure 304 (e.g., enclosure 102 in FIG. 1). In the illustrated embodiment, the enclosure 304 extends partially under the bottom surface of the lower cover sheet 404 and can support the cover sheet 400. A fingerprint sensor assembly 410 is attached to a portion of the bottom surface of the lower cover sheet 404 between the edge of the enclosure 304 and an edge of the intermediate layer 306 disposed between the lower cover sheet 404 and the display layer 302. A conductive connector 310, such as a flexible circuit, connects the fingerprint sensor 312 (see FIG. 4B) to a conductive contact or to an integrated circuit 314.

In some embodiments, a color masking layer may be included in the display stack over the fingerprint sensor to reduce the visibility of the fingerprint sensor to the user. The color masking layer can be disposed around the peripheral edges of the display layer 302 (above the display layer) so that other components and circuitry can be located in the areas around the display layer and not be visible to the user.

Through vias 408 are formed in the lower cover sheet 404 above the fingerprint sensor 312. In some embodiments, the through vias 408 can also be formed in areas of the lower cover sheet that are not above the fingerprint sensor. The through vias 408 extend vertically upwards in the lower cover sheet 404 from the fingerprint sensor 312 to the attachment mechanism 406. The length L of the through vias 408 is substantially equal to the thickness T of the lower cover sheet 404. Any suitable method can be used to form the through vias 408 in the lower cover sheet 404. The through vias 408 can be another form of blind vias, in that blind vias are formed when lower cover sheet 404 is attached to the upper cover sheet. In some embodiments, it may be easier to form vias entirely through one layer. Positioning the layer with the vias under another layer can render the vias less visible to a user.

Some or all of the through vias 408 can be filled with an anisotropic material, which may be a dielectric. The conductive material can have a higher or lower anisotropy than the anisotropy of the lower cover sheet 404. The material used to fill the through vias can be selected to make the vias less visible through the cover sheet. For example, any or all of the index of refraction, color, transparency and other optical properties of the material in the vias may match, or approach, those of the cover sheet. The through vias 408 can shape the electric field through induced anisotropy that is produced by the change in permittivity in the through vias 408, thereby increasing or modifying the anisotropy of the material in the cover sheet 404. In some embodiments, the electric fields are channeled into the through vias 408 when the through vias are filled with a material having a higher anisotropy than the cover sheet 404. When the through vias 408 are filled with a dielectric material, the electric field can be directed outside of the through vias 408, which shapes the electric field in a different way.

Figure 4B:
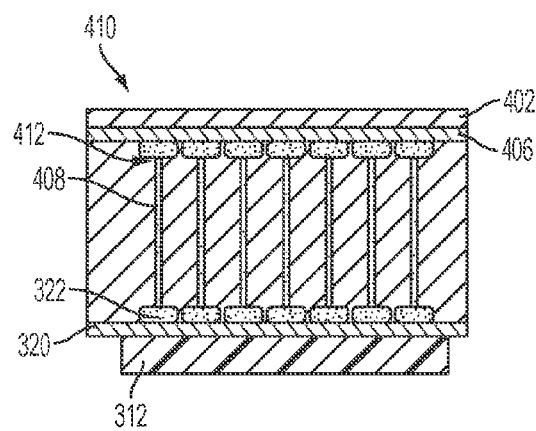
FIG. 4B is an enlarged view of area in FIG. 4A.

An enlarged view of area 410 is shown in FIG. 4B. The fingerprint sensor 312 can be attached to the bottom surface of the lower cover sheet 404 with an adhesive 320. Optional conductive plates 322 can be attached between the lower cover sheet 404 and the fingerprint sensor 312 (e.g., attached to the bottom surface of the lower cover sheet 404). Optional conductive plates 412 can be attached between the upper and lower cover sheets 402, 404 (e.g., near or at the top surface of the lower cover sheet 404). In some embodiments, the conductive plates 322, 412 can improve the sensitivity of the fingerprint sensor by providing a conductive interface between the termination point of the through vias 408 and the fingerprint sensor 312.

The top surface of the cover sheet can act as an input region for the fingerprint sensor 312. When a finger touches the input region, the capacitance of one or more capacitive sensing elements changes, and the measured capacitances can be used to capture a fingerprint image. The through vias 408 can carry the fingerprint sensing signals through the lower cover sheet 404 with minimum degradation.

Figure 5:
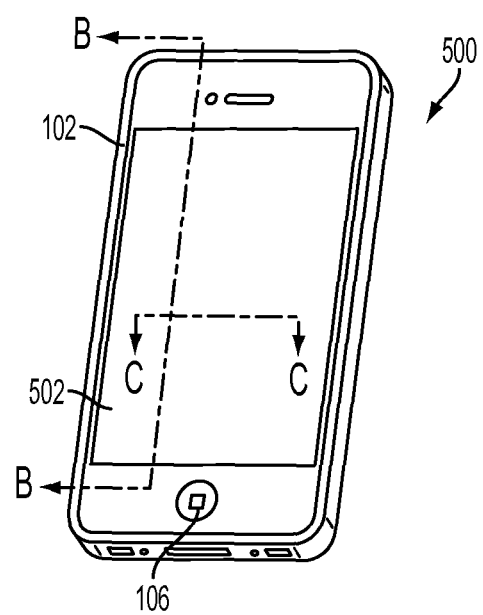
FIG. 5 is a perspective view of another example of an electronic device that can include a fingerprint sensor in a display stack of an electronic device.

Referring now to FIG. 5, there is shown a perspective view of another example of an electronic device that can include a fingerprint sensor in a display of an electronic device. In the illustrated embodiment, the electronic device 500 is implemented as a smart telephone. Other embodiments can implement the electronic device differently, such as, for example, as a laptop computer, a tablet computing device, a display input device, and other types of electronic devices that include a display.

The electronic device shown in FIG. 5 is similar to the embodiment of FIG. 1 except for the display 502. The display may be formed with a display stack that includes a full panel fingerprint sensor. The operation of the full panel fingerprint sensor can be similar to the operation of the fingerprint sensor of FIG. 1 in that a single pre-defined fixed location is used to capture a single fingerprint. Alternatively, a user can touch any location on the top surface of the display (i.e., the input region) with one or more fingertips, one or more fingers, a palm, and/or an entire hand and the fingerprint sensor can capture one fingerprint image at a time or acquire multiple fingerprint images substantially simultaneously (or acquire a palm print image or hand print image).

Figure 6:
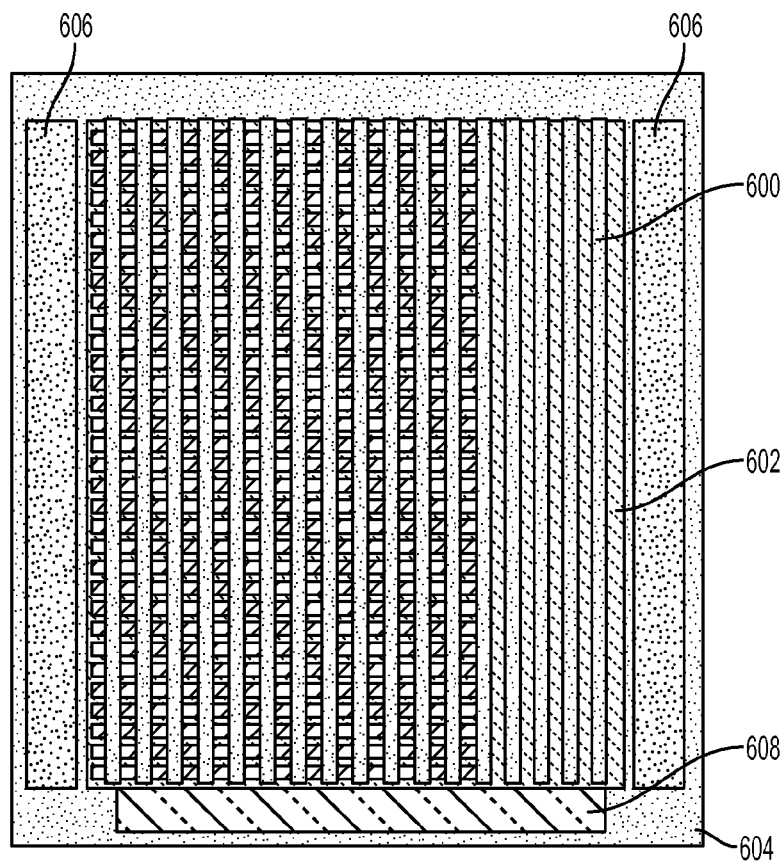
FIG. 6 is a simplified plan view of an integrated sensing apparatus and display in FIG. 5.

FIG. 6 is a simplified plan view of the display 502 in FIG. 5 in accordance with an embodiment. The display stack includes a first patterned conductive layer 600 disposed over a second patterned conductive layer 602. A display layer 604 is positioned below the second patterned conductive layer 602. The first and second patterned conductive layers can be made of any suitable conductive material, such as a metal or a conductive oxide. For example, in a display stack, the first and second patterned conductive layers 600, 602 can be made of a substantially transparent conductive material such as indium tin oxide (ITO). The first and second patterned conductive layers can have any given pitch. For example, in some embodiments, the pitch of the first and second patterned conductive layers is less than 100 microns. In one embodiment, the pitch of the first and second patterned conductive layers is approximately 50 microns.

A dielectric layer (see 700 in FIG. 7) is typically positioned between the first and second conductive layers. The dielectric layer can have any given thickness, such as, for example, 25 to 50 microns. In the illustrated embodiment, the first patterned conductive layer 600 is patterned into columns and the second patterned conductive layer 602 into rows. Row circuitry 606 and column circuitry 608 can each be disposed along the outer periphery of one or more sides of the electronic device over a top surface of the display layer 604. The row circuitry 606 can transmit and/or receive signals from the second patterned conductive layer 602 and well as other control or operational signals for the display. Similarly, the column circuitry 608 can transmit and/or receive signals from the first patterned conductive layer 600 and well as other control or operational signals for the display. The row and column circuitry may be implemented as TFTs, for example.

In some embodiments, the display also functions as a touch sensing device in addition to functioning as a fingerprint sensor. The touch sensing device may multiplex a given number of patterned conductive layers when sensing signals from the patterned conductive layers. By way of example only, the pitch of a touch sensing device may be 5 mm while the pitch of the fingerprint sensor is 50 microns. The magnitude of the difference between the two pitches is 100. Thus, 100 patterned conductive layers (e.g., patterned row or patterned column lines) are multiplexed and sensed when operating as a touch sensing device and each patterned conductive layer is sensed when operating as a fingerprint sensor.

Figure 7:
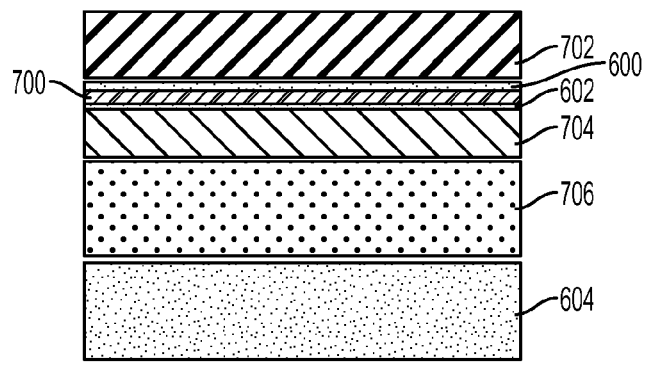
FIG. 7 is a simplified cross-section view of the display taken along line B-B in FIG. 5.

FIG. 7 is a simplified cross-section view of the display 502 taken along line B-B in FIG. 5 in accordance with an embodiment. A display stack for the display 502 includes a first cover sheet 702 disposed over the first patterned conductive layer 600 and a second cover sheet 704 disposed below the second patterned conductive layer 602. Both the first and second cover sheets 702, 704 can have any given thickness, such as, for example, 200 microns. The first and second cover sheets 702, 704 can be made of any suitable material. An intermediate layer 706 is positioned between the second cover sheet 704 and the display layer 604. The intermediate layer 706 can be implemented with one or more layers. For example, the intermediate layer 706 can be similar to the intermediate layer 306 in FIG. 3.

Figure 10:
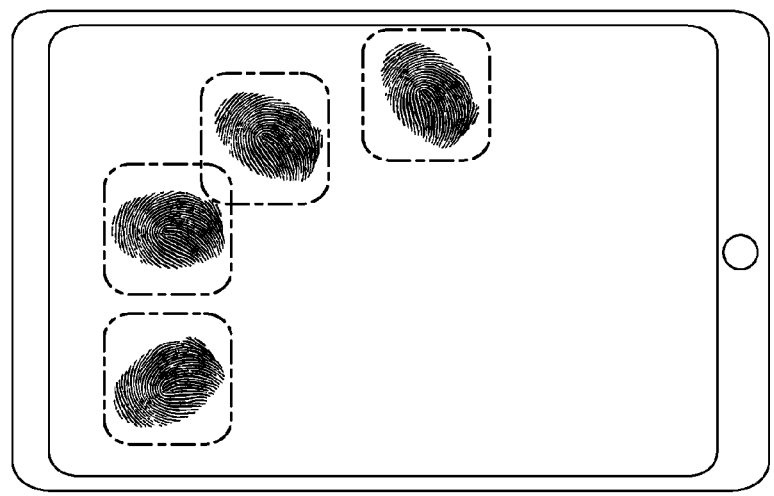
FIGS. 8-10 are various top views of an electronic device showing options for operating a full panel fingerprint sensor in a display.
Figure 9:
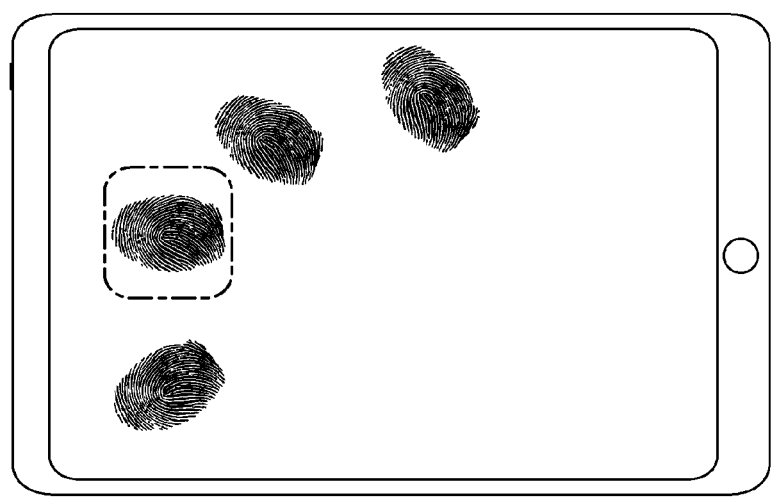
Figure 8:
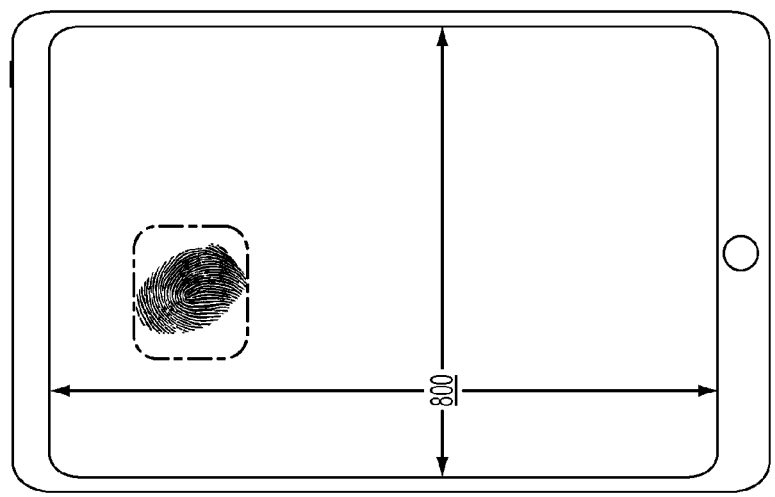

FIGS. 8-10 are various top views of an electronic device showing options for operating a full panel fingerprint sensor in a display. In FIGS. 8-10, the fingerprint sensing function can occur at any location on the display. In FIGS. 8-10, the portion of the electronic device that functions to both display information and sense touch is the "active area" 800. It should be appreciated that the active area 800 may change in size, shape and other configurations in various embodiments. In FIG. 8, the display is configured as a single touch display and the full panel fingerprint sensor captures only one fingerprint at a time. In FIG. 9, the display is configured as a multi-touch display and the full panel fingerprint sensor captures only one fingerprint at a time. In FIG. 10, the display is configured as a multi-touch display and the full panel fingerprint sensor captures multiple fingerprints substantially at one time.

Figure 11A:
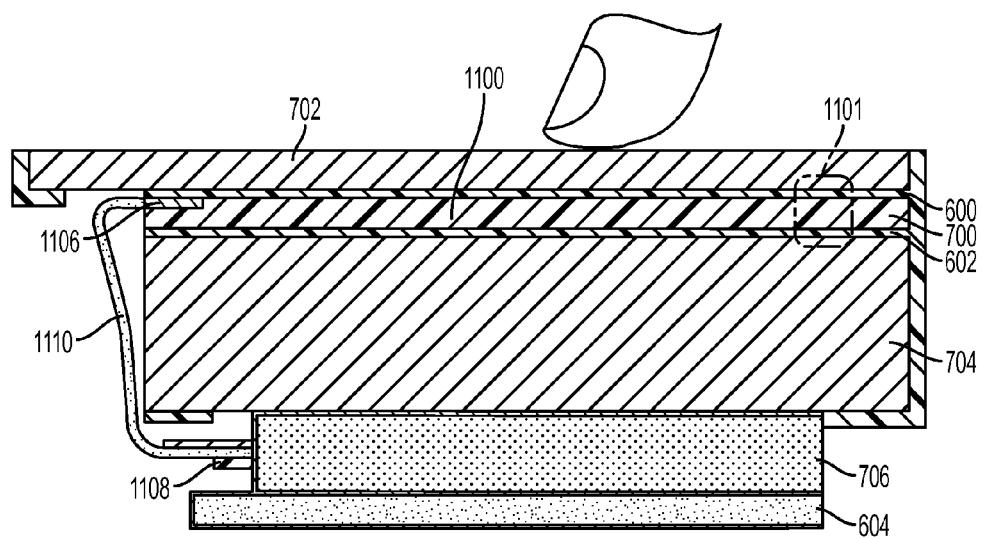
FIG. 11A is a simplified cross-section view of the display taken along line B-B in FIG. 5 in accordance with another embodiment.

Referring now to FIG. 11A, there is shown a simplified cross-section view of the display 502 taken along line B-B in FIG. 5 in accordance with another embodiment. Some of the elements shown in FIGS. 11A-11B can be the same elements as elements in the embodiment of FIG. 7. Identical reference numbers are used in the figures for these elements. For simplicity and clarity, the elements are not described in detail.

A display stack for the display can include a first cover sheet 702 disposed over a capacitive sensing device 1100. The first cover sheet 702 and the capacitive sensing device 1100 can have any given thickness. By way of example, only, the thickness of the first cover sheet 702 can be 100 to 200 microns, and the thickness of the capacitive sensing device 1100 can be 25 to 100 microns.

Figure 11B:
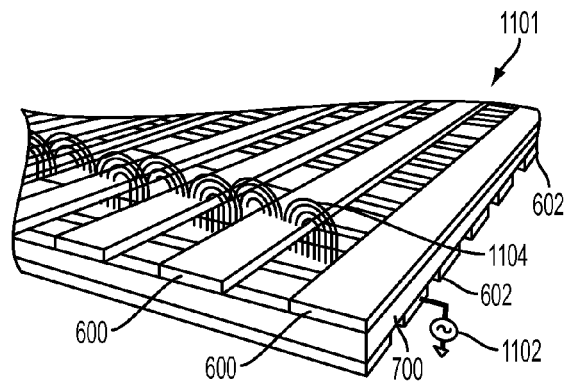
FIG. 11B is an enlarged view of an area of a capacitive sensing device in FIG. 11A.

FIG. 11B is an enlarged view of area 1101 of the capacitive sensing device 1100 in FIG. 11A. The capacitive sensing device 1100 can include the dielectric layer 700 disposed between the first and second patterned conductive layers 600, 602. As described earlier, the first patterned conductive layer 600 is patterned into discrete column lines of conductive material and the second patterned conductive layer 602 can be patterned into discrete row lines of conductive material. Other embodiments can pattern the first patterned conductive layer 600 into discrete row lines or lines having a different orientation, and pattern the second patterned conductive layer 602 into discrete column lines or lines having a different orientation.

A capacitive sensing element is formed at each intersection of a column line and a row line. The capacitive sensing device 1100 can operate in a self-capacitance mode or in a mutual capacitance mode. In the illustrated embodiment, the capacitive sensing device 1100 operates in a self-capacitance mode with a voltage supply 1102 operably connected to the row lines of the second patterned conductive layer 602. An excitation signal is applied to one or more row lines of the second patterned conductive layer 602 when the capacitive sensing device is measuring capacitance of one or more capacitive sensing elements. Sense signals are measured on one or more column lines of the first patterned conductive layer 600 and used to determine the capacitances of the capacitance sensing elements. Electric field lines 1104 are produced by the capacitance sensing elements.

The example fingerprint sensor assembly in FIG. 11A includes a first set of remote electronics 1106 operably connected to a second set of remote electronics 1108 via a conductive connector 1110. The conductive connector 1110 can be any suitable type of connector, such as a flexible circuit. The first set of remote electronics 1106 can be positioned at or in an edge of the capacitive sensing device 1100 and can include TFT drive circuitry and multiplexers for the capacitive sensing device 1100. The second set of remote electronics 1108 can be attached to a bottom surface of the second cover sheet or on a surface of the display layer. The second set of remote electronics 1108 can include sense circuitry, amplifiers, and an analog-to-digital converter as well as other signal processing circuitry.

Figure 12A:
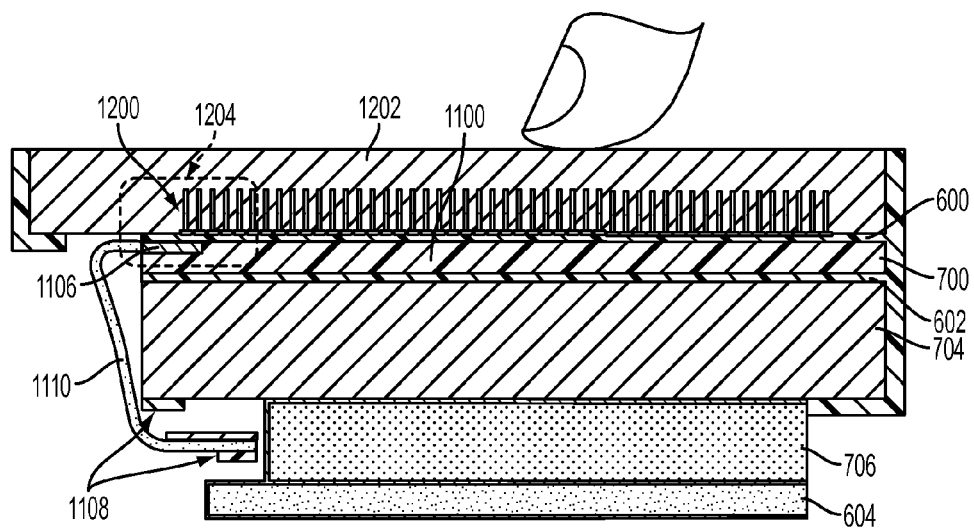
FIG. 12A is a simplified cross-section view of the display taken along line B-B in FIG. 5 in accordance with another embodiment.
Figure 12B:
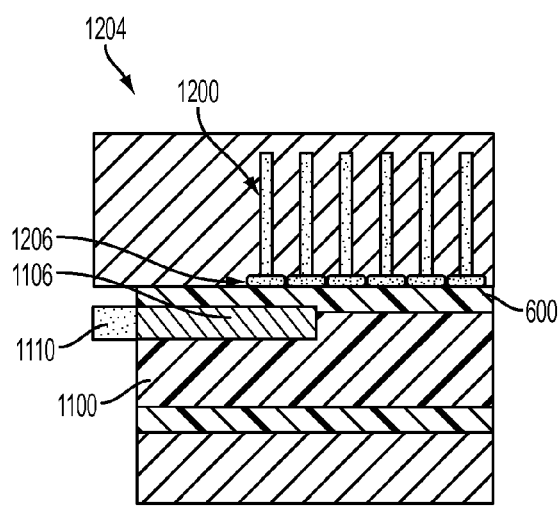
FIG. 12B is an enlarged view of area 1204 in FIG. 12A.

Referring now to FIG. 12A, there is shown a simplified cross-section view of the display 502 taken along line B-B in FIG. 5 in accordance with another embodiment. The embodiment of FIGS. 12A-12B is similar to the embodiment of FIGS. 11A-11B and identical reference numbers are used in FIGS. 12A-12B for elements that can be the same as elements in FIGS. 11A-11B. For simplicity and clarity, these elements are not described in detail.

Blind vias 1200 are formed in a first cover sheet 1202. The first cover sheet 1202 can have any given thickness. The blind vias 1200 extend vertically upwards from the capacitive sensing device 1100 through only a portion of the first cover sheet 1202. The blind vias do not extend through the entire first cover sheet 1202 in the illustrated embodiment. Instead, the blind vias 1200 have any given length that is less than the thickness of the first cover sheet 1202. The length of the blind vias 1200 can be based on one or more factors. For example, the type of fingerprint sensor, the type of electronic device, the properties of the materials in the display stack, and/or cosmetic factors may be considered when determining the length of the blind vias. All of the blind vias 1200 can have the same length or one or more blind vias can have a length that is different from one or more other blind vias. Any suitable method can be used to form the blind vias 1200 in the first cover sheet 1202.

Some or all of the blind vias 1200 can be filled with a conductive or dielectric material. The conductive material can have a higher or lower conductivity than the conductivity of the first cover sheet 1202. The material used to fill the blind vias can be selected to make the vias less visible through the cover sheet. The blind vias 1200 can shape the electric field in a similar manner as the blind vias 316 described in conjunction with FIGS. 3A-3B.

An enlarged view of area 1204 is shown in FIG. 12B. Optional conductive plates 1206 can be attached between the first cover sheet 1202 and the capacitive sensing device 1100 (e.g., attach to the top surface of the first patterned conductive layer 600). In some embodiments, the conductive plates can improve the sensitivity of the capacitive sensing device 1100 by providing a conductive interface between the termination point of the blind vias 1200 and the fingerprint sensor (i.e., capacitive sensing device) 1100.

Figure 13A:
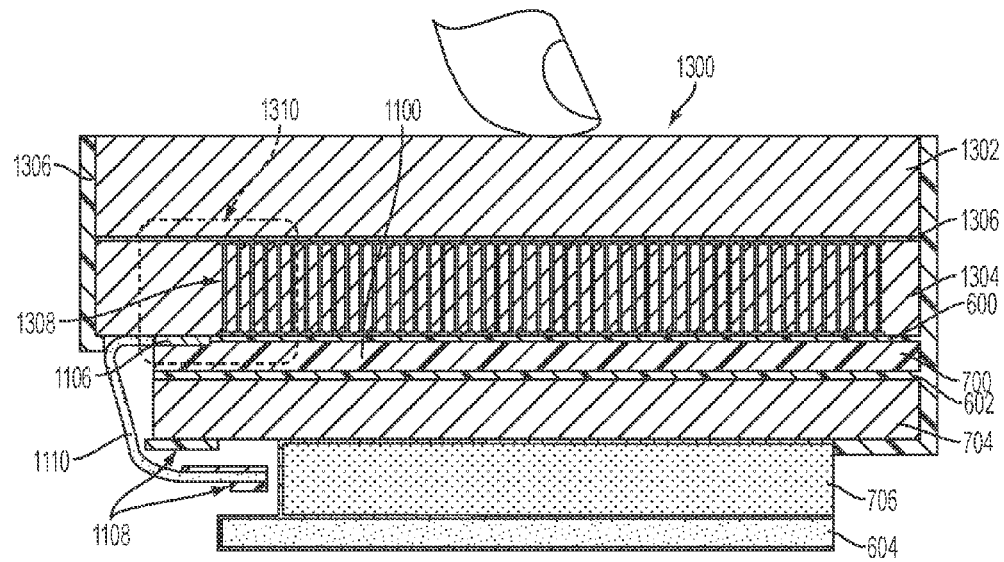
FIG. 13A is a simplified cross-section view of the display taken along line B-B in FIG. 5 in accordance with another embodiment.
Figure 13B:
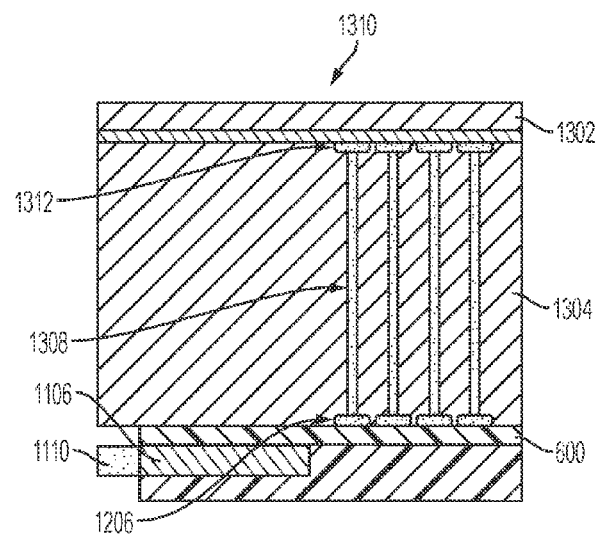
FIG. 13B is an enlarged view of area 1310 in FIG. 13A.

FIG. 13A is a simplified cross-section view of the display 502 taken along line B-B in FIG. 5 in accordance with another embodiment. The embodiment of FIGS. 13A-13B is similar to the embodiment of FIGS. 12A-12B and identical reference numbers are used in FIGS. 13A-13B for elements that are the same as elements in FIGS. 12A-12B. For simplicity and clarity, the elements are not described in detail.

The first cover sheet 1300 is divided into an upper cover sheet 1302 and a lower cover sheet 1304. The upper and lower cover sheets 1302, 1304 can each have any given thickness. The upper cover sheet 1302 can be attached to the lower cover sheet 1304 using any suitable attachment mechanism 1306. An adhesive is one example of an attachment mechanism. The upper and lower cover sheets 1302, 1304 can each be made of any suitable material.

Through vias 1308 are formed in the lower cover sheet 1304 above the capacitive sensing device 1100. The through vias 1308 extend vertically upwards in the lower cover sheet from the capacitive sensing device 1100 to the attachment mechanism 1306. The length of the through vias can be substantially equal to the thickness of the lower cover sheet 1304. Any suitable method can be used to form the through vias 1308 in the lower cover sheet 1304.

Some or all of the through vias 1308 can be filled with an anisotropic material, which may be a dielectric. The anisotropic material can have a higher or lower anisotropy than the anisotropy of the lower cover sheet 1304. The material used to fill the through vias can be selected to make the vias less visible through the cover sheet and may have one or more optical characteristics that match or nearly match the optical characteristic(s) of the cover sheet. The through vias 1308 can shape the electric field in a similar manner as the through vias 408 described in conjunction with FIGS. 4A-4B.

An enlarged view of area 1310 is shown in FIG. 13B. Optional conductive plates 1206 can be attached between the first patterned conductive layer 600 and the lower cover sheet 1304 (e.g., to the top surface of the first patterned conductive layer 6001. Optional conductive plates 1312 can be attached between the upper and lower cover sheets 1302, 1304 (e.g., to the top surface of the lower cover sheet 1304). In some embodiments, the conductive plates 1206, 1312 can improve the sensitivity of the capacitive sensing device 1100 by providing a conductive interface between the termination point of the through vias 1308 and the fingerprint sensor (i.e., capacitive sensing device) 1100.

Figure 14:
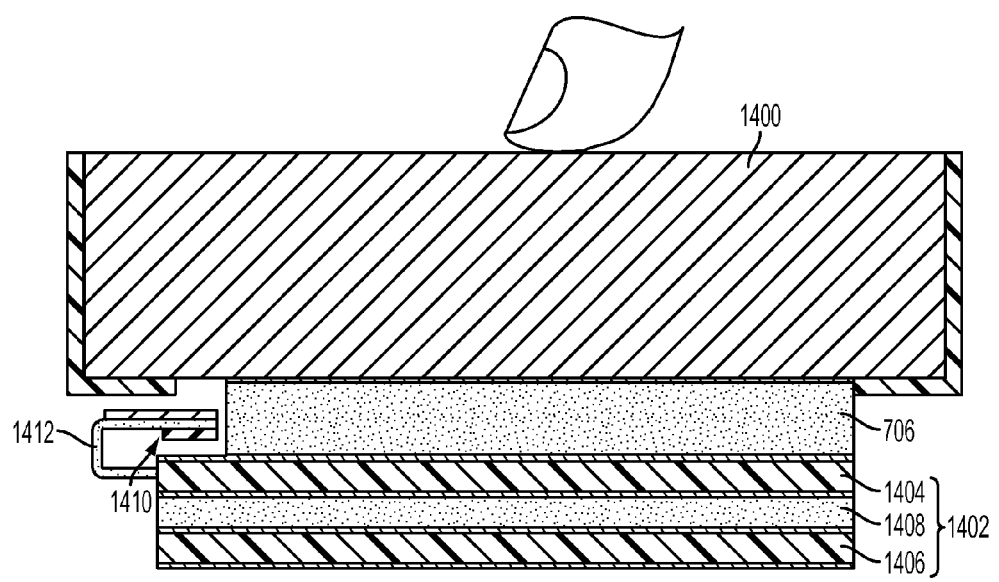
FIG. 14 is a simplified cross-section view of the display taken along line B-B in FIG. 5 in accordance with another embodiment.

Referring now to FIG. 14, there is shown a simplified cross-section view of the display 502 taken along line B-B in FIG. 5 in accordance with another embodiment. Some of the elements shown in FIG. 14 can be the same elements as the elements in the embodiment of FIG. 7. Identical reference numbers are used in the figures for these elements. For simplicity and clarity, the elements are not described in detail.

A display stack for the display can include a cover sheet 1400 disposed over an ultrasonic sensing device 1402. The cover sheet 1400 can have any given thickness. By way of example only, the thickness of the cover sheet 1400 can be less than 600 microns. The cover sheet 1400 can be made of any suitable material. Additionally, the cover sheet 1400 can include an electric field shaping enhancement. Examples of electric-field shaping enhancements include, but are not limited to, blind vias or through vias. Some or all of the blind or through vias may be filled with a conductive or dielectric material.

The ultrasonic sensing device 1402 can include an ultrasonic piezoelectric receiver array layer 1404 and an ultrasonic piezoelectric transmitter layer 1406. The ultrasonic piezoelectric receiver array layer 1404 can include multiplexers and the ultrasonic piezoelectric transmitter layer 1406 can be plane or segmented driver.

A display layer 1408 can be positioned between the ultrasonic piezoelectric receiver array layer 1404 and the ultrasonic piezoelectric transmitter layer 1406. In some embodiments, the display layer 1408 can be implemented as a TFT LCD.

An intermediate layer 706 is positioned between the cover sheet 1400 and the ultrasonic piezoelectric receiver array layer 1404. Remote sensing circuitry 1410 can be attached to the top surface of the ultrasonic piezoelectric receiver array layer 1404 or to a surface of the display layer 1408. The remote sensing electronics 1410 is operatively connected to the ultrasonic piezoelectric receiver array layer 1404 with a conductive connector 1412. The conductive connector 1412 can be any suitable type of connector, such as a flexible circuit. In some embodiments, a color masking layer may be included over the remote sensing electronics to reduce the visibility of the fingerprint sensor to the user. The color masking layer can be disposed around the peripheral edges of the display layer 1408 (above the display layer) so that other components and circuitry can be located in the areas around the display layer and not be visible to the user.

Figure 15:
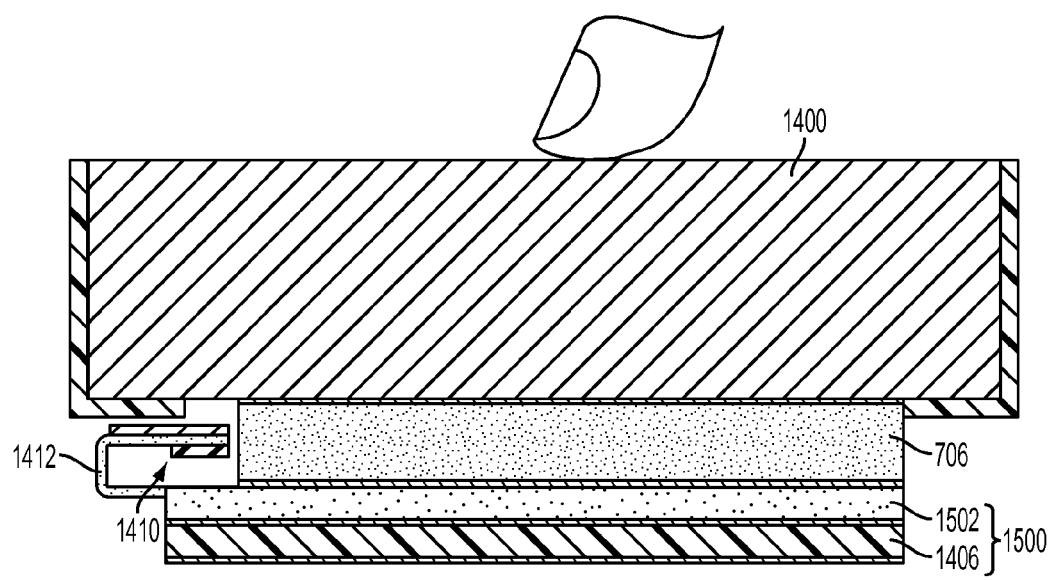
FIG. 15 is a simplified cross-section view of the display taken along line B-B in FIG. 5 in accordance with another embodiment.

FIG. 15 is a simplified cross-section view of the display 502 taken along line B-B in FIG. 5 in accordance with another embodiment. The embodiment of FIG. 15 is similar to the embodiment of FIG. 14 and identical reference numbers are used in FIG. 15 for elements that are the same as elements in FIG. 14. For simplicity and clarity, the elements are not described in detail.

The display stack can include a cover sheet 1400 disposed over an ultrasonic sensing device 1500. The ultrasonic sensing device 1500 can include a display+in-cell ultrasonic piezoelectric receiver array layer 1502 and an ultrasonic piezoelectric transmitter layer 1406. In some embodiments, the display can be implemented as a TFT LCD. An intermediate layer 706 is positioned between the cover sheet 1400 and the display+in-cell ultrasonic piezoelectric receiver array layer 1502. Remote sensing circuitry 1410 can be attached to the top surface of the display+in-cell ultrasonic piezoelectric receiver array layer 1502 or to a bottom surface of the cover sheet 1400. The remote sensing electronics 1410 is operatively connected to the display+in-cell ultrasonic piezoelectric receiver array layer 1502 with a conductive connector 1412.

Figure 16:
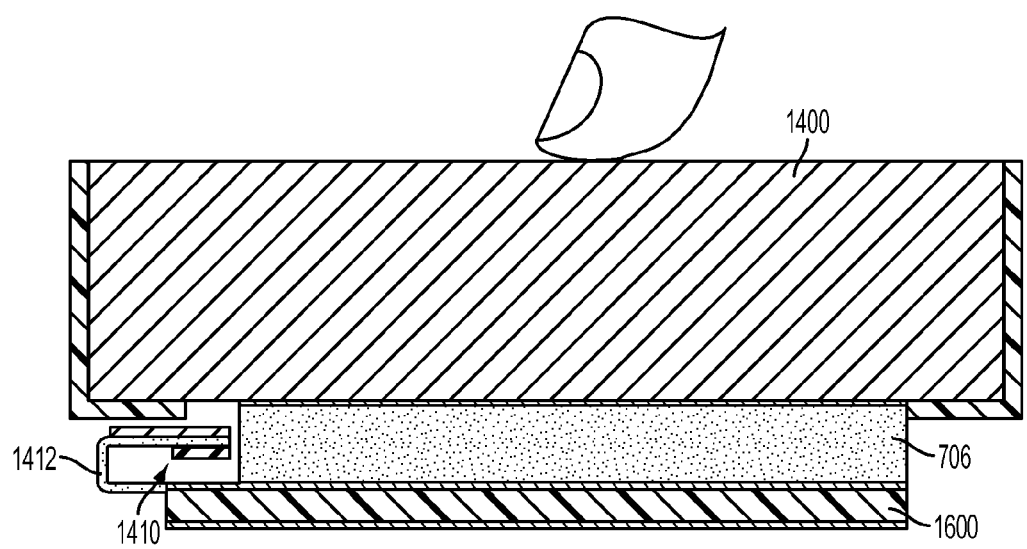
FIG. 16 is a simplified cross-section view of the display taken along line B-B in FIG. 5 in accordance with another embodiment.

Referring now to FIG. 16, there is shown a simplified cross-section view of the display 502 taken along line B-B in FIG. 5 in accordance with another embodiment. The embodiment of FIG. 16 is similar to the embodiment of FIG. 14 and identical reference numbers are used in FIG. 16 for elements that are the same as elements in FIG. 14. For simplicity and clarity, the elements are not described in detail.

The display stack can include a cover sheet 1400 disposed over a display+in-cell capacitive sensing layer 1600. In some embodiments, the display can be implemented as a TFT LCD. An intermediate layer 706 is positioned between the cover sheet 1400 and the display+in-cell capacitive sensing layer 1600. Remote sensing circuitry 1410 can be attached to the top surface of the display+in-cell capacitive sensing layer 1600 or to a bottom surface of the cover sheet 1400. The remote sensing electronics 1410 is operatively connected to the display+in-cell capacitive sensing layer 1600 with a conductive connector 1412.

Figure 17:
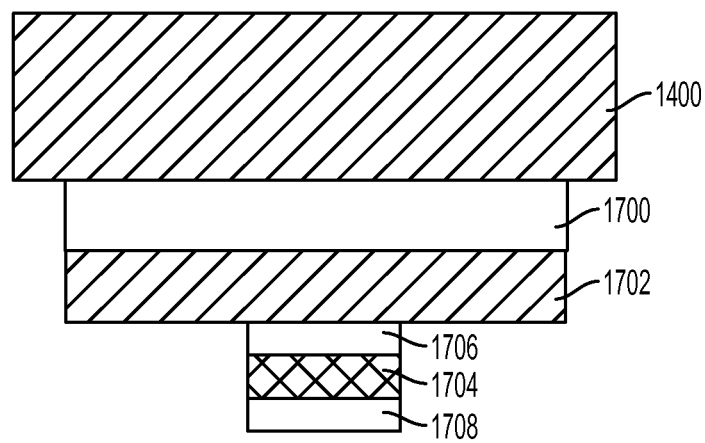
FIG. 17 is a simplified cross-section view of the display taken along line C-C in FIG. 5 in accordance with another embodiment.

FIG. 17 is a simplified cross-section view of the display taken along line C-C in FIG. 5 in accordance with another embodiment. The display stack for the display can include a cover sheet 1400 disposed over a touch sensing device 1700 and a display layer 1702. The touch sensing device 1700 can include any type of touch sensing technology, such as capacitive, resistive, optical, thermal, and piezoelectric. The display layer 1702 can be implemented with any suitable display technology, including OLED. It should be appreciated that the display layer 1702 may be implemented as a plastic OLED display layer, as may any OLED display layer discussed herein with respect to any embodiment.

A fingerprint sensor 1704 is positioned between a first layer 1706 of an ultrasonic sensing device and a second layer 1708 of the ultrasonic sensing device. In one embodiment, the first layer 1706 is a piezoelectric copolymer receiver layer and the second layer a polyvinylidene fluoride (PVDF) transmitter layer, although alternative embodiments may employ different piezoelectric materials to form the first and/or second layers. The fingerprint sensor 1704 can include a complementary metal-oxide-semiconductor (CMOS) silicon (as may any fingerprint sensor discussed herein with respect to any embodiment). With CMOS silicon, a higher number of transistors can be used in the fingerprint sensor in a smaller space, which can add flexibility to the design of the fingerprint sensor. For example, with a CMOS silicon fingerprint sensor, the per pixel voltages can be buffered locally and then read out at a later time. A different type of silicon can be included in the fingerprint sensor in other embodiments. By way of example only, a low temperature polycrystalline silicon (LTPS) can be used on glass or sapphire.

Figure 18:
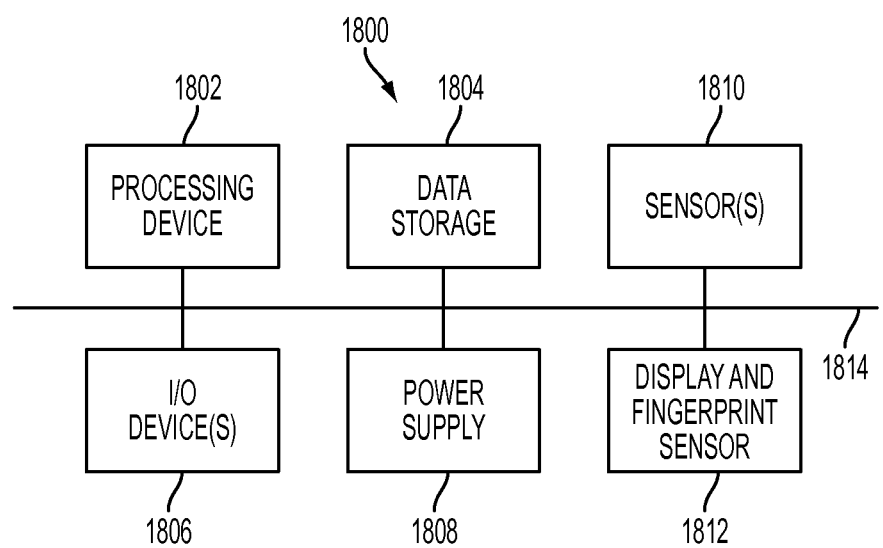
FIG. 18 is a block diagram of an electronic device in accordance with an embodiment.

Referring now to FIG. 18, there is shown a block diagram of an electronic device in an embodiment. The electronic device 1800 can include one or more processing devices 1802, one or more data storage devices 1804, input/output (I/O) device(s) 1806, a power supply 1808, one or more sensors 1810, and a display and fingerprint sensor 1812. The one or more processing devices 1802 can control some or all of the operations of the electronic device 1800. The processing device(s) 1802 can communicate, either directly or indirectly, with substantially all of the components of the electronic device 1800. For example, one or more system buses or signal lines 1814 or other communication mechanisms can provide communication between the processing device(s) 1802, the data storage device(s) 1804, the I/O device(s) 1806, the power supply 1808, the sensor(s) 1810, the display 1812, and/or the fingerprint sensor 1812.

The processing device(s) 1802 can be implemented as any electronic device capable of processing, receiving, or transmitting data or instructions. For example, the one or more processing devices 1802 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements. The processing device 1802 can receive the fingerprint images from the fingerprint sensor or from other circuitry and process the fingerprint images.

The data storage device(s) 1804 can store electronic data that can be used by the electronic device 1800. For example, a data storage device can store electrical data or content such as, for example, audio files, images including fingerprint images, video, settings and user preferences, and timing signals. The data storage device(s) 1804 can be configured as any type of memory. By way of example only, the memory can be implemented as random access memory, read-only memory, Flash memory, removable memory, or other types of storage elements, in any combination.

The input/output device(s) 1806 can receive data from a user or one or more other electronic devices. Additionally, the input/output device(s) 1806 can facilitate transmission of data to a user or to other electronic devices. For example, the I/O device 1806 can transmit electronic signals via a wireless or wired connection. Examples of wireless and wired connections include, but are not limited to, WiFi, Bluetooth, IR, and Ethernet. Additionally, the I/O device(s) 1806 can include a display, a touch sensing input region such as a trackpad, one or more buttons, one or more microphones or speakers, a keyboard, and/or a force sensing switch or switches.

The power supply 1808 can be implemented with any device capable of providing energy to the electronic device 1800. For example, the power supply 1808 can be one or more batteries or rechargeable batteries, or a connection cable that connects the remote control device to another power source such as a wall outlet.

The one or more sensors 1810 can include any suitable type of sensor or sensors, such as a motion sensor, a proximity sensor, an orientation sensor (e.g., gyroscope), and/or an accelerometer.

As previously described, a fingerprint sensor is included in a display stack for the display 1812. Any suitable display technology can be implemented in the display layer. Example display technologies include, but are not limited to, liquid crystal display (LCD) technology and light emitting diode (LED) technology. Additionally, the fingerprint sensor can employ any type of sensing technology, including, but not limited to, capacitive, piezoelectric, and ultrasonic sensing technologies.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. An electronic device, comprising:
    a display stack comprising:
        a cover sheet disposed over a display layer;
        a full panel capacitive fingerprint sensor configured to capture a fingerprint image of a finger positioned on a top surface of the cover sheet, the full panel capacitive fingerprint sensor also functioning as a touch sensing device; and
        one or more vias formed through at least a portion of the cover sheet above the full panel capacitive fingerprint sensor to shape an electric field passing through the cover sheet; and
    a first remote electronics disposed at an edge of the full panel capacitive fingerprint sensor and operably connected to the full panel capacitive fingerprint sensor;
    wherein the cover sheet comprises:
    a first cover sheet disposed over the full panel capacitive fingerprint sensor; and
    a second cover sheet disposed below the full panel capacitive fingerprint sensor.

2. The electronic device as in claim 1, further comprising a processing device operably connected to the fingerprint sensor.

3. The electronic device as in claim 1, further comprising a processing device operably connected to the display layer.

4. The electronic device as in claim 1, wherein an intermediate layer is disposed between the cover sheet and the display layer.

5. The electronic device as in claim 1, further comprising an intermediate layer disposed between the second cover sheet and the display layer, wherein a second remote electronics is operably connected to the first remote electronics and the second remote electronics is attached to one of the display layer and the bottom surface of the second cover sheet.

6. The electronic device as in claim 1, wherein the one or more vias comprises one or more blind vias formed in the first cover sheet above the full panel capacitive fingerprint sensor, wherein a length of each blind via is less than a thickness of the first cover sheet.

7. The electronic device as in claim 6, further comprising one or more conductive plates each positioned between a respective blind via and a bottom surface of the first cover sheet.

8. The electronic device as in claim 6, further comprising one or more conductive plates positioned between a top surface of the fingerprint sensor and a bottom surface of the first cover sheet.

9. The electronic device as in claim 1, wherein the one or more vias comprises one or more through vias formed in the first cover sheet above the full panel capacitive fingerprint sensor, wherein a length of the through vias is substantially equal to a thickness of the first cover sheet.

10. The electronic device as in claim 9, further comprising a conductive plate positioned near a top and a bottom of at least one through via.

11. An electronic device, comprising:
    a display stack comprising:
        a cover sheet disposed over a display layer;
        a full panel ultrasonic fingerprint sensor positioned below the cover sheet and configured to capture a fingerprint image of a finger positioned on a top surface of the cover sheet; and
        one or more vias formed through at least a portion of the cover sheet above the fingerprint sensor to shape an electric field passing through the cover sheet; the full panel ultrasonic fingerprint sensor comprising:
    an ultrasonic piezoelectric receiver layer attached to an intermediate layer in the display stack, wherein the intermediate layer is positioned between the cover sheet and the display layer; and
    an ultrasonic piezoelectric transmitter layer below the ultrasonic piezoelectric receiver layer, wherein the display layer is positioned between the ultrasonic piezoelectric receiver layer and the ultrasonic piezoelectric transmitter layer.

12. The electronic device as in claim 11, further comprising remote sensing electronics operably connected to the ultrasonic piezoelectric receiver layer.

13. A display for an electronic device, the display comprising:
    a cover sheet disposed over a touch sensing layer;
    a display layer disposed below the touch sensing layer;
    an ultrasonic receiver layer disposed below the display layer;
    an ultrasonic transmitter layer disposed below the ultrasonic receiver layer; and
    a fingerprint sensor positioned between the ultrasonic receiver layer and the ultrasonic transmitter layer.

14. The display as in claim 13, wherein the ultrasonic receiver layer comprises a piezoelectric copolymer receiver layer and the ultrasonic transmitter layer comprises a polyvinylidene fluoride transmitter layer.

* * * * *